Dec. 29, 1970    C. M. CASON III, ETAL    3,551,843
NONCAVITY LASER CONFIGURATION
Filed Jan. 8, 1969
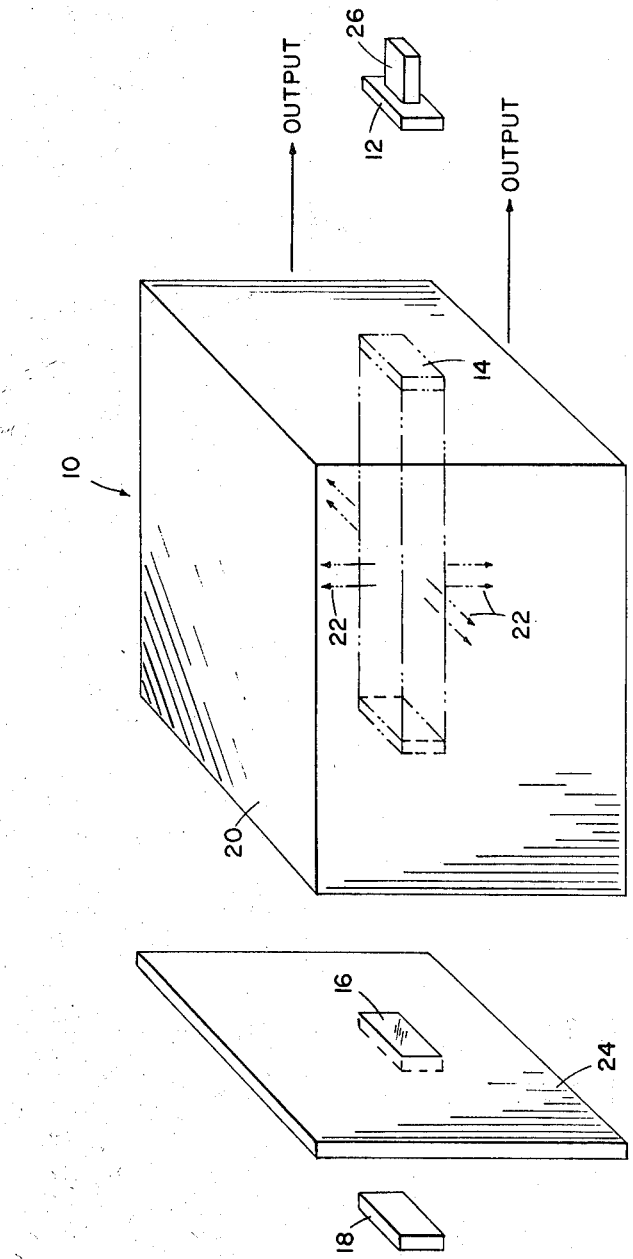
Charles M. Cason, III
James F. Perkins,
        INVENTORS.
BY

United States Patent Office 3,551,843
Patented Dec. 29, 1970

---

3,551,843
NONCAVITY LASER CONFIGURATION
Charles M. Cason III, and James F. Perkins, Huntsville, Ala., assignors to the United States of America as represented by the Secretary of the Army
Filed Jan. 8, 1969, Ser. No. 789,687
Int. Cl. H01s *3/05*
U.S. Cl. 331—94.5                              3 Claims

ABSTRACT OF THE DISCLOSURE

A non-cavity laser has the gain-possessing-medium outside of a Fabry-Perot cavity. A low power laser having a Fabry-Perot cavity is used to provide the driving signal for a high power non-cavity laser. The electric field of the active Fabry-Perot cavity extends beyond the cavity to stimulate emission in the active medium of the high power laser and synchronize the output thereof with the cavity oscillation. Due to the synchronization between the output laser and the control laser, a detector that measures a low percentage of the light frequency of the control laser is readily calibrated to indicate output power.

BACKGROUND OF THE INVENTION

The usual laser is considered on the basis of having a Fabry-Perot cavity surrounding an active medium having gain due to a population inversion of two levels of a radiative quantum transition. The amplifying medium lies within the volume of the Fabry-Perot cavity. Output from the cavity is obtained from transmission of a part of the reflected signal back into the cavity, called transmission coupling, or by a hole cut through one mirror, called hole coupling. With either type of coupling, the oscillator output radiation arises solely from quantum transitions occurring within the Fabry-Perot cavity. Other lasers take a signal within the allowed operating frequency and amplify it due to the gain obtained within the population inversion. This is called the laser amplifier. The usual laser amplifier consists of an active volume containing an amplifying medium, a provision for input of a signal which is to be amplified, and a provision for output of the amplified signal.

There is only one type of laser which operates outside the laser-oscillator or laser-amplifier modes and that is called the superradiant laser, which is a system having extra large inversion or extra long path length. This type of laser has no means of controlling its output. The output power which is obtained, is a result of a very large value of single-pass gain, resulting either from the very high inversion density, the very large path length, or a combination of the two. Operation of this device does not require positive feedback in a Fabry-Perot cavity. It is also incoherent, having a widely divergent beam, thus limiting its usefulness to only very close applications.

SUMMARY OF THE INVENTION

A non-cavity laser that has the gain-possessing-medium outside of the Fabry-Perot cavity. The Fabry-Perot cavity used as a control may be adjacent to or enclosed by the laser output medium possessing gain. A single power source may pump both the cavity and laser output medium. The non-cavity laser can deliver a coherent output in a controlled manner without operating as an amplifier or in a superradiant state. The control cavity produces a signal which is capable of modifying superradiant emission with the Fabry-Perot cavity providing the control therefor. Activity within the Fabry-Perot cavity develops an electric field that extends into the non-cavity active medium and stimulates emission therein that is coherent and synchronous with the controllable electric field.

BRIEF DESCRIPTION OF THE DRAWINGS

The single figure is a perspective view of a preferred embodiment of the invention.

DESCRIPTION OF THE PREFERRED EMBODIMENT

Referring now to the drawings wherein there is disclosed a preferred embodiment of the present invention. A laser device 10 includes a laser optical cavity (Fabry-Perot) comprising a fully reflective mirror 12 aligned to project a reflected light frequency through a medium 14 sensitive thereto. The reflected beam is partially reflected by another mirror 16 to set up oscillations of the light frequency in the cavity between and including mirrors 12 and 16. A portion of light (about 1%) is passed by mirror 16 and is sensed by a detector 18. Detector 18 may be a phosphor that is sensitive to the light frequency involved or may be any detector that could indicate a light output and the mode structure, pattern, thereof.

An active medium 20 is adjacent to but effectively exterior to the Fabry-Perot cavity. Medium 20 may completely or partially encompass the cavity, or may lie adjacent thereto. An electric field 22 created by the cavity oscillator (elements 12, 14, and 16) extends into active medium 20. A fully reflective mirror 24 reflects light energy generated in medium 20, back through the medium. Mirrors 24 and 16 may be separate components, one being framed by the other or they may be integrated into one mirror having a partially reflective inner surface that is aligned with elements 14 and 12. An adjustment device 26 attached to mirror 12 is used to provide three dimensional adjustments for mirror 12, thereby insuring alignment of mirrors 12 and 16 and viewing detector 18.

Medium 20 possesses a population inversion between a radiative quantum transition. This is a necessary requirement for any type of laser. Laser 10 does possess the conventional Fabry-Perot cavity but very little power from lasing action escapes this cavity. That quantity of power which escapes is due to the diffraction limited operation of the Fabry-Perot system, and this does not contribute to output power in a direct manner. A single power source, not shown, can be used to pump both active mediums 14 and 20. Lasing within mediums 14 and 20 is simultaneous, with the electric field developed about medium 14 serving as a control for medium 20. Stimulation and control of emission from medium 20 is achieved when electromagnetic field 22 caused by photons or waves oscillating within the Fabry-Perot cavity extend into the exterior active medium. There may exist a critical stimulation ratio, the ratio of the extended field intensity to the inversion density in exterior active medium 20, which must be overcome for lasing operation.

Laser mediums 14 and 20 may be solid, liquid or gas and may be of the same medium having no walls separating them, although this is not required. Both mediums 14 and 20 possess gain and may be pumped by the same power source (not shown). The cavity oscillator comprising elements 12, 14, and 16 produce essentially no useful output. The output comes from region 20 which could be of any appropriate dimensions, not being limited to long and narrow sections. The critical ratio of field intensity per inversion density specifies that a critical length is required for an active medium having a particular gain. For lasers this will be less than the length required for superradiance. This condition in a carbon dioxide laser is achieved with a length of about 40 feet, or less.

A special case exists for controlling superradiant lasers. When medium 20 is operating in a superradiant manner, the output can be controlled as follows: When the operating Fabry-Perot cavity, elements 12, 14, and 16, lowers the gain in medium 14 below the superradiant threshold for the particular length of device, adjustment device 26 allows $x$, $y$, and $z$ positional adjustment to determine the mode on target or detector 18. The electric field extending from region 14 will be experienced by region 20 and therefore, a laser (for example, argon ion or long $CO_2$ laser) which operates in a superradiant mode may be forced to operate in a controlled way at the desired mode. This system would be ideally suited for self-terminating lasers such as the metal-vapor systems.

Although a particular embodiment and form of this invention has been illustrated, it is obvious to those skilled in the art that modifications may be made without departing from the scope and spirit of the foregoing disclosure. Therefore, it is understood that the invention is limited only by the claims appended hereto.

We claim:

1. A controlled non-cavity laser system comprising: an active, gain-possessing-medium having first and second ends, for emitting a frequency of light when eternally stimulated; means for stimulating said medium; first and second parallel light reflective means at said ends of said medium; said first reflective means having a diameter smaller than the diameter of said first end and reflecting light through only a portion of said medium; and said second light reflective means being coextensive with said first end and being capable of reflecting light through the entire medium, said second reflective means being fully reflective with the exception of a partially reflective portion in coaxial alignment with said first reflective means, whereby a controlled laser beam is emitted from the non-reflective part of said first end.

2. A laser system as set forth in claim 1 further comprising a detector means adjacent to said partially reflective portion for sensing and indicating a light frequency pattern.

3. A laser system as set forth in claim 2 wherein said reflective means are mirrors and an electric field created within said portion of said medium interacts with the active medium adjacent thereto to control an emitted laser beam therefrom.

References Cited

UNITED STATES PATENTS

| | | |
|---|---|---|
| 3,292,103 | 12/1966 | Soules et al. |
| 3,293,565 | 12/1966 | Hardy. |
| 3,309,621 | 3/1967 | Evtuhov. |
| 3,316,507 | 4/1967 | Collins et al. |
| 3,339,151 | 8/1967 | Smith. |
| 3,363,196 | 1/1968 | Eknayan. |
| 3,369,192 | 2/1968 | Koester. |
| 3,397,024 | 8/1968 | Boyden et al. |
| 3,427,456 | 2/1969 | Caulfield. |
| 3,473,030 | 10/1969 | Mevers et al. |

OTHER REFERENCES

La Tourette et al.: "Improved Laser Angular Brightness Through Diffraction Coupling," Applied Optics, vol. 3, pp. 981–2, August, 1964.

RONALD L. WIBERT, Primary Examiner

E. S. BAUER, Assistant Examiner